United States Patent
Nakasawa

(10) Patent No.: US 10,910,611 B2
(45) Date of Patent: Feb. 2, 2021

(54) BATTERY BLOCK AND BATTERY MODULE

(71) Applicant: Panasonic Intellectual Property Management Co., Ltd., Osaka (JP)

(72) Inventor: Nobuyuki Nakasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 16/307,506

(22) PCT Filed: Jun. 12, 2017

(86) PCT No.: PCT/JP2017/021582
§ 371 (c)(1),
(2) Date: Dec. 6, 2018

(87) PCT Pub. No.: WO2018/003467
PCT Pub. Date: Jan. 4, 2018

(65) Prior Publication Data
US 2019/0305262 A1      Oct. 3, 2019

(30) Foreign Application Priority Data
Jun. 29, 2016   (JP) .................................. 2016-129136

(51) Int. Cl.
*H01M 2/10*         (2006.01)
*H01M 2/20*         (2006.01)
(Continued)

(52) U.S. Cl.
CPC .......... *H01M 2/1016* (2013.01); *C01B 32/05* (2017.08); *C01B 32/19* (2017.08); *H01M 2/10* (2013.01);
(Continued)

(58) Field of Classification Search
CPC ..................... H01M 2/1077; H01M 10/0525
See application file for complete search history.

(56) References Cited

U.S. PATENT DOCUMENTS

| 2015/0325824 A1 | 11/2015 | Hasegawa et al. |
| 2016/0149177 A1 | 5/2016 | Sugeno et al. |
| 2018/0175348 A1 | 6/2018 | Sugeno et al. |

FOREIGN PATENT DOCUMENTS

| JP | 2013-030382 | 2/2013 |
| JP | 2015-011956 | 1/2015 |

(Continued)

OTHER PUBLICATIONS

International Search Report of PCT application No. PCT/JP2017/021582 dated Sep. 12, 2017.

*Primary Examiner* — Olatunji A Godo
(74) *Attorney, Agent, or Firm* — McDermott Will and Emery LLP

(57) ABSTRACT

A battery block includes a plurality of cylindrical batteries, a battery holder that accommodates the cylindrical batteries arranged in a staggered manner, a positive-electrode current collector plate that is electrically connected to a positive electrode terminal of each of the cylindrical batteries, and a negative-electrode current collector plate that is electrically connected to a negative electrode terminal of each of the cylindrical batteries. At least one of the positive-electrode current collector plate and the negative-electrode current collector plate includes a bus bar that extends in an axial direction of the cylindrical battery to be electrically connected to a current collector plate of another battery block. A recess that accommodates the bus bar is formed in a gap between two of the cylindrical batteries in an end portion of the battery holder.

8 Claims, 7 Drawing Sheets

(51) Int. Cl.
*H01M 10/04* (2006.01)
*C01B 32/05* (2017.01)
*C01B 32/19* (2017.01)

(52) U.S. Cl.
CPC ............. *H01M 2/20* (2013.01); *H01M 2/202* (2013.01); *H01M 10/0413* (2013.01); *H01M 10/0422* (2013.01)

(56) References Cited

FOREIGN PATENT DOCUMENTS

WO     WO2012164837    *   6/2012
WO       2012/164837       12/2012
WO       2014/119287        8/2014

* cited by examiner

BATTERY BLOCK AND BATTERY MODULE

This application is a U.S. national stage application of the PCT International Application No. PCT/JP2017/021582 filed on Jun. 12, 2017, which claims the benefit of foreign priority of Japanese patent application 2016-129136 filed on Jun. 29, 2016, the contents all of which are incorporated herein by reference.

TECHNICAL FIELD

The present disclosure relates to a battery block and a battery module.

BACKGROUND ART

There has been conventionally known a battery module configured by electrically connecting battery blocks each of which includes a plurality of cylindrical batteries (for example, see PTL 1). The battery module disclosed in PTL 1 is configured by stacking two battery blocks in an axial direction of the cylindrical battery. In addition, there has been also known a battery module configured by arranging two or more battery blocks in a direction along a column of cylindrical batteries.

CITATION LIST

Patent Literature

PTL 1: Unexamined Japanese Patent Publication No. 2015-11956

SUMMARY OF THE INVENTION

When a battery module is formed by electrically connecting two or more battery blocks in a direction along a column of cylindrical batteries, it is very important to reduce a space between the battery blocks for the purpose of enhancing capacity density of the battery module.

A battery block according to an aspect of the present disclosure includes a plurality of cylindrical batteries, a battery holder that accommodates the cylindrical batteries arranged in a staggered manner, a positive-electrode current collector plate that is electrically connected to a positive electrode terminal of each of the cylindrical batteries, and a negative-electrode current collector plate that is disposed to be opposite to the positive-electrode current collector plate with each of the cylindrical batteries being provided between the negative-electrode current collector plate and the positive-electrode current collector plate and that is electrically connected to a negative electrode terminal of each of the cylindrical batteries. At least one of the positive-electrode current collector plate and the negative-electrode current collector plate includes a bus bar that extends in an axial direction of each of the cylindrical batteries to be electrically connected to a current collector plate of another battery block. The battery holder includes a plurality of columns of the cylindrical batteries where the cylindrical batteries in adjacent columns are arranged in a staggered manner and the cylindrical batteries near an end portion of the battery holder respectively have different distances to the end portion of the battery holder by a staggered arrangement of the cylindrical batteries. A recess that accommodates the bus bar is formed in a gap between two cylindrical batteries in two columns closer to the end portion of the battery holder.

According to a battery block of an aspect of the present disclosure, it is possible to provide a battery module in which a space between the battery block and another battery block adjacently arranged can be reduced and capacity density can be enhanced.

DESCRIPTION OF EMBODIMENT

Figure 1:
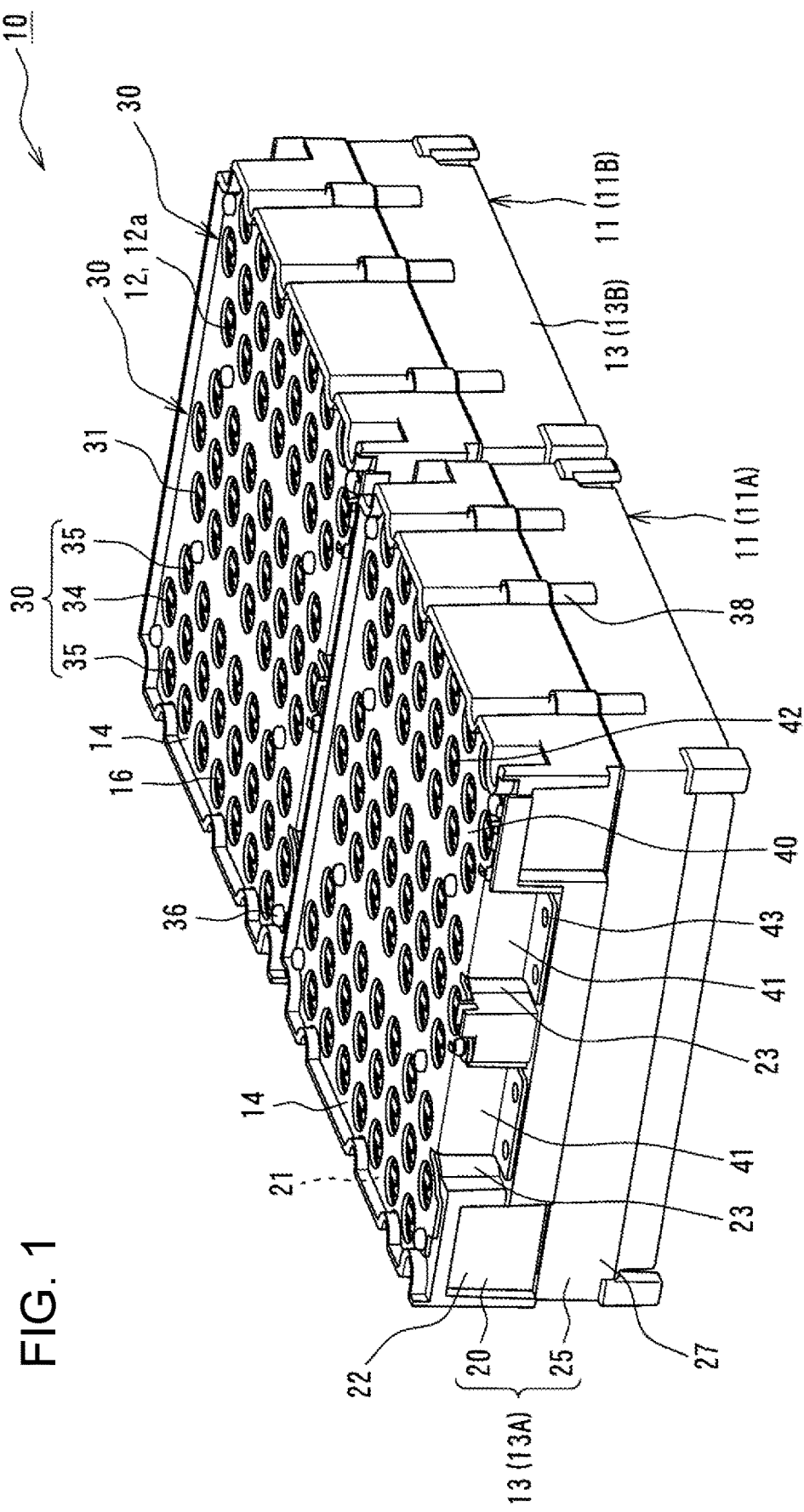
FIG. 1 is a perspective view of a battery block and a battery module according to an example of an exemplary embodiment, as viewed obliquely from above on a front side.

As described above, in a battery module configured by electrically connecting a plurality of battery blocks arranged in a direction along a column of cylindrical batteries, it is very important to reduce a space between the battery blocks for the purpose of enhancing capacity density of the battery module. To solve such a problem, in a battery holder of a battery block according to an aspect of the present disclosure, a recess that accommodates a bus bar of a current collector plate is formed in a gap between cylindrical batteries arranged in a staggered manner (a zigzag pattern). Such a recess is formed and thus the bus bar does not extend largely from an end of the battery holder and it is possible to prevent the space between two battery blocks from being increased due to the bus bar. That is, the space between the battery blocks can be reduced and the capacity density of the battery module can be enhanced.

The bus bar is formed by, for example, bending the current collector plate. By forming the recess, the current collector plate is bent gently. If the recess is not present, the current collector plate is bent sharply for the purpose of reducing a length of an extending portion of the bus bar as much as possible. In this case, stress easily concentrates on a bent portion and durability of the current collector plate is reduced. That is, by forming the recess and gently bending the current collector plate, the concentration of stress is reduced and durability of a connection configuration is increased. When an amount of current flowing in a current collector plate is increased, a thick current collector plate is commonly used, but such a current collector plate is difficult to be bent at a right angle. By forming a recess, the thick current collector plate can be gently bent for use.

In addition, the recess is formed in an end portion of the battery holder using a space in which no cylindrical battery is arranged. For this reason, according to the battery block of the aspect of the present disclosure, the space between battery blocks can be reduced without reducing a number of cylindrical batteries incorporated.

An example of an exemplary embodiment is described below in detail. A battery block and a battery module according to the present disclosure are not limited to the exemplary embodiment described below. Drawings referred to in a description of the exemplary embodiment are schematically drawn, and thus dimensions and the like of configuration elements illustrated in the drawings should be understood in view of the following description.

Hereinafter, for convenience of explanation, a direction along a column of cylindrical batteries is referred to as a "longitudinal direction" of a battery block or the like, and a direction that columns of cylindrical batteries are arranged is referred to as a "horizontal direction" of the battery block or the like. A direction along an axial direction of a cylindrical battery is referred to as a "vertical direction" of the battery block or the like, a side of a positive-electrode current collector plate is referred to as "upper", and a side of a negative-electrode current collector plate is referred to as "lower". In addition, one side (a front side) of the battery block in the longitudinal direction in which a first recess for accommodating a positive-electrode-side bus bar is formed, is referred to as "front". Another side (a rear side) of the battery block in the longitudinal direction in which a second recess for accommodating a negative-electrode-side bus bar is formed, is referred to as "rear".

Figure 2:
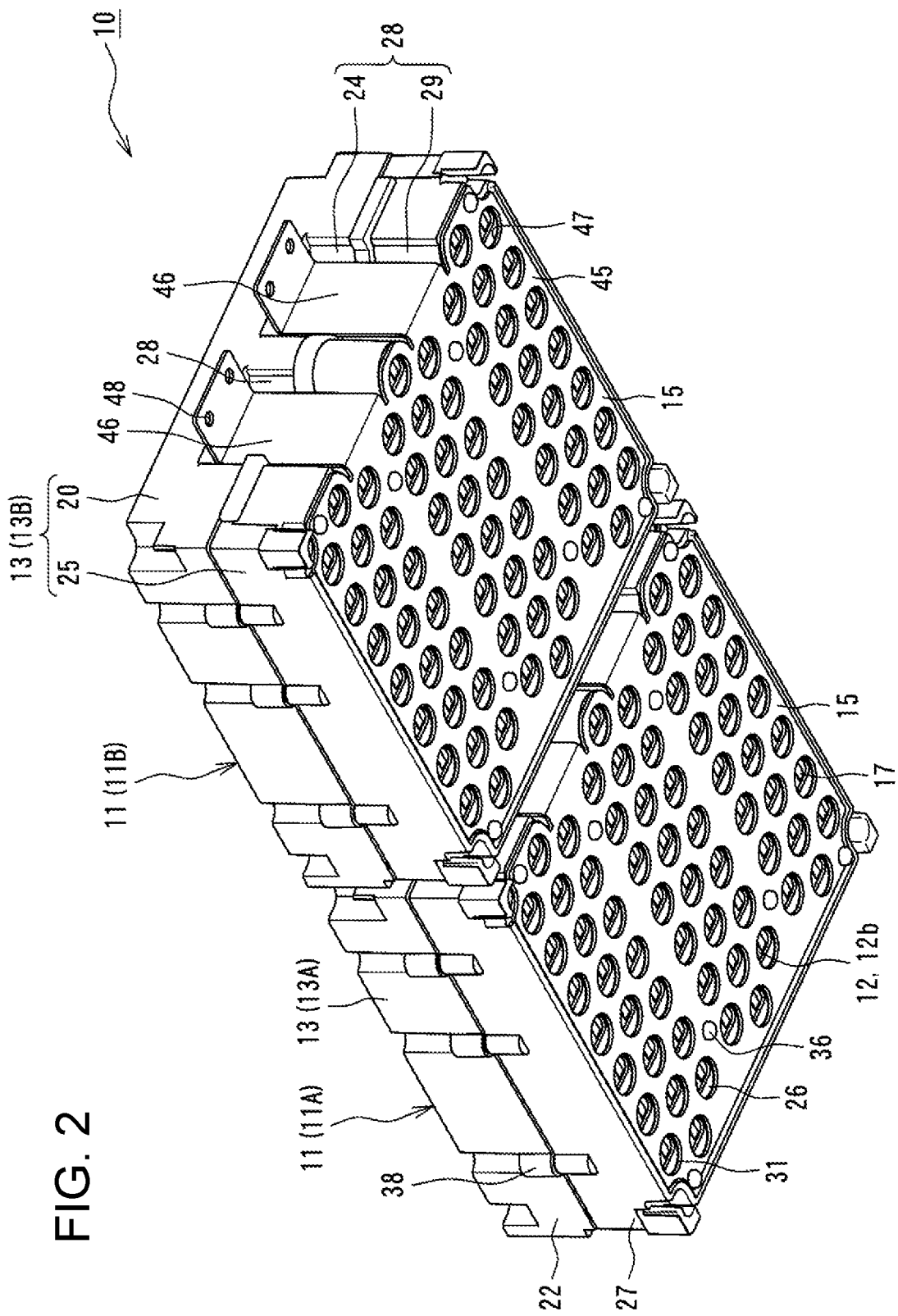
FIG. 2 is a perspective view of the battery block and the battery module according to the example of the exemplary embodiment, as viewed obliquely from below on a rear side.

FIGS. 1 and 2 are perspective views of battery module 10 configured by electrically connecting two battery blocks 11 according to an example of an exemplary embodiment. As exemplified in FIGS. 1 and 2, battery block 11 constituting battery module 10 includes a plurality of cylindrical batteries 12 and battery holder 13 accommodating cylindrical batteries 12 arranged in a staggered manner. In addition, battery block 11 includes positive-electrode current collector plate 14 electrically connected to a positive electrode terminal of each cylindrical battery 12, and a negative-electrode current collector plate 15 that is disposed to be opposite to positive-electrode current collector plate 14 with each cylindrical battery 12 being provided between negative-electrode current collector plate 15 and positive-electrode current collector plate 14 and is electrically connected to a negative electrode terminal of each cylindrical battery 12. Battery block 11 is an assembled battery unit in which battery holders 13 accommodating cylindrical batteries 12 are connected in parallel to each other.

Although specifically described later, at least one of positive-electrode current collector plate 14 and negative-electrode current collector plate 15 includes a bus bar extending in an axial direction of cylindrical battery 12 to be electrically connected to current collector plates of other battery blocks. In an end portion of battery holder 13, a recess for accommodating the bus bar is formed in a gap between two cylindrical batteries 12 in two columns of cylindrical batteries 12 closer to the end portion of battery holder 13. In the present exemplary embodiment, bus bar 41 is formed in positive-electrode current collector plate 14 and bus bar 46 is formed in negative-electrode current collector plate 15. Examples of the recess include recess 23 (first recess) accommodating bus bar 41 (positive-electrode-side bus bar) and recess 28 (second recess) accommodating bus bar 46 (negative-electrode-side bus bar).

Battery module 10 is configured by serially connecting two battery blocks 11 arranged in a longitudinal direction along a column of cylindrical batteries 12. In battery module 10, a rear surface of battery block 11A is disposed to be opposite to a front surface of battery block 11B. For example, two battery blocks 11 are identical, and have a same shape and size and a same number of cylindrical batteries 12 incorporated. For convenience of explanation, one battery block 11 is referred to as "battery block 11A (first battery block)" and another battery block 11 is referred to as "battery block 11B (second battery block)". Although specifically described later, battery module 10 is configured by connecting bus bar 46A of battery block 11A to bus bar 41B of battery block 11B. Battery module 10 may be configured by electrically connecting three or more battery blocks 11.

Battery block 11 further includes positive-electrode lead plate 16 and negative-electrode lead plate 17. Positive-electrode lead plate 16 is interposed between upper wall 21 of battery holder 13 and positive-electrode current collector plate 14 and is electrically connected to the positive electrode terminal of each cylindrical battery 12. Negative-electrode lead plate 17 is interposed between lower wall 26 of battery holder 13 and negative-electrode current collector plate 15 and is electrically connected to a negative electrode terminal of each cylindrical battery 12. That is, positive-electrode current collector plate 14 is electrically connected via positive-electrode lead plate 16 to the positive electrode terminal of each cylindrical battery 12, and negative-electrode current collector plate 15 is electrically connected via negative-electrode lead plate 17 to the negative electrode of each cylindrical battery 12.

Cylindrical battery 12 includes a metallic battery case and a power generation element accommodated in the metallic battery case. The power generation element includes, for example, an electrode assembly with a winding structure and a non-aqueous electrolyte. The battery case includes positive-electrode-side end surface 12a and negative-electrode-side end surface 12b formed at axially both ends in a substantially perfect circular shape and side surface 12c that is a curved surface axially extending. The battery case has a substantially cylindrical shape that is longer in the axial direction than in a radial direction. The battery case is constituted by a case main body formed in a cylindrical shape with a bottom for the purpose of accommodating a power generation element and a sealing body sealing an opening of the case main body. A gasket is commonly disposed between the case main body and the sealing body.

In the present exemplary embodiment, an upper surface of the sealing body is positive-electrode-side end surface 12a and a lower surface of the case main body is negative-electrode-side end surface 12b. For example, the sealing body has a layered structure including a valve, and functions as the positive electrode terminal of cylindrical battery 12. The case main body functions as the negative electrode terminal of cylindrical battery 12. Positive-electrode lead plate 16 is connected to positive-electrode-side end surface 12a and negative-electrode lead plate 17 is connected to negative-electrode-side end surface 12b.

Battery holder 13 includes an internal space that can accommodate cylindrical batteries 12. Battery holder 13 is also a battery case that accommodates cylindrical batteries 12. Battery holder 13 has a substantially rectangular parallelepiped shape that is longer in the longitudinal and horizontal directions than in the vertical direction. For example, a vertical length of battery holder 13 is slightly longer than an axial length of cylindrical battery 12. A longitudinal length of battery holder 13 is determined based on a length of a column of cylindrical batteries 12 or the like, and a horizontal length of battery holder 13 is determined based on a number of accommodating part groups 30 to be described later or the like.

Battery holder 13 is, for example, a resin holder. A resin composing battery holder 13 is preferably a curable resin, for example, a resin having such a cross-linked structure as not to melt when being exposed to a temperature of 600° C. or higher. Specific examples of the resin include thermosetting resins including unsaturated polyester, an epoxy resin, a melamine resin, and a phenol resin. Thermosetting resins may contain thermal conductive fillers such as an insulating metal oxide and a metal nitride, and endothermic fillers exhibiting an endothermic action during thermal decomposition such as aluminum hydroxide.

Battery holder 13 includes a plurality of battery accommodating parts 31 formed in a staggered manner (a zigzag pattern). In battery holder 13, cylindrical batteries 12 in adjacent columns are arranged in a staggered manner. Battery holder 13 includes a plurality of columns of cylindrical batteries 12 where cylindrical batteries 12 near the end portion of battery holder 13 respectively have a different distance to the end portion of battery holder 13 because of a staggered arrangement of cylindrical batteries 12. Two or more accommodating part groups 30 are formed in the present exemplary embodiment. Each of accommodating part group 30 is a group of battery accommodating parts 31 formed in three columns such that cylindrical batteries 12 are arranged in a staggered manner. Three accommodating part groups 30 are arranged in the horizontal direction of battery holder 13. A gap wider than a space between battery accommodating parts 31 constituting each accommodating part group 30 is formed between accommodating part groups 30.

Each accommodating part group 30 is configured such that a number of battery accommodating parts 31 forming center column 34 of three columns of battery accommodating parts 31 is larger than a number of battery accommodating parts 31 forming columns 35 at both ends by one. Each of columns 34, 35 is formed by arranging battery accommodating parts 31 straight in the longitudinal direction. Battery accommodating parts 31 forming column 34 and battery accommodating parts 31 forming column 35 are arranged in a staggered manner to be shifted from each other by a half pitch in the longitudinal direction. That is, a distance from cylindrical battery 12 near the end portion of battery holder 13 in column 34 to the end portion of battery holder 13 is shorter than a distance from cylindrical battery 12 near the end portion of battery holder 13 in column 35 to the end portion of battery holder 13 by a half pitch of the space between cylindrical batteries 12.

In the present exemplary embodiment, column 34 is formed by eight battery accommodating parts 31 and column 35 is formed by seven battery accommodating parts 31. Column 34 projects frontward and rearward from both ends of column 35 by a length that is substantially half of battery accommodating part 31. As described above, column 35 is shorter than column 34, and thus a space in which no cylindrical battery 12 is arranged is formed between two accommodating part groups 30 in a longitudinal end portion of battery holder 13 and this space is larger than those in other portions. Although specifically described later, in battery holder 13, the space is used to form recesses 23, 28 for accommodating the bus bar in a portion of battery holder 13 in which columns 35 are arranged, that is, between column 34 and adjacent column 34.

Figure 3:
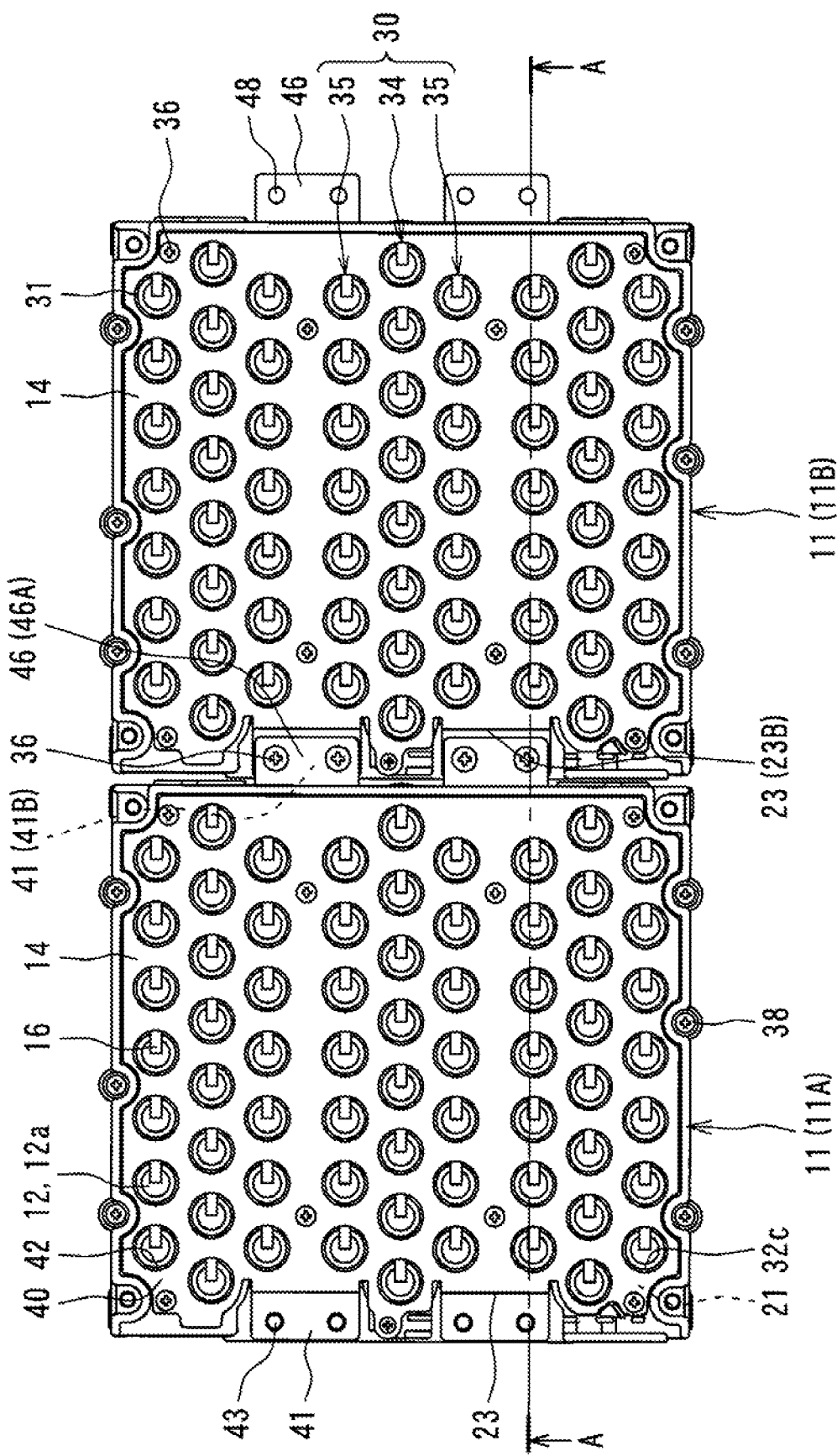
FIG. 3 is a plan view of the battery block and the battery module according to the example of the exemplary embodiment.
Figure 4:
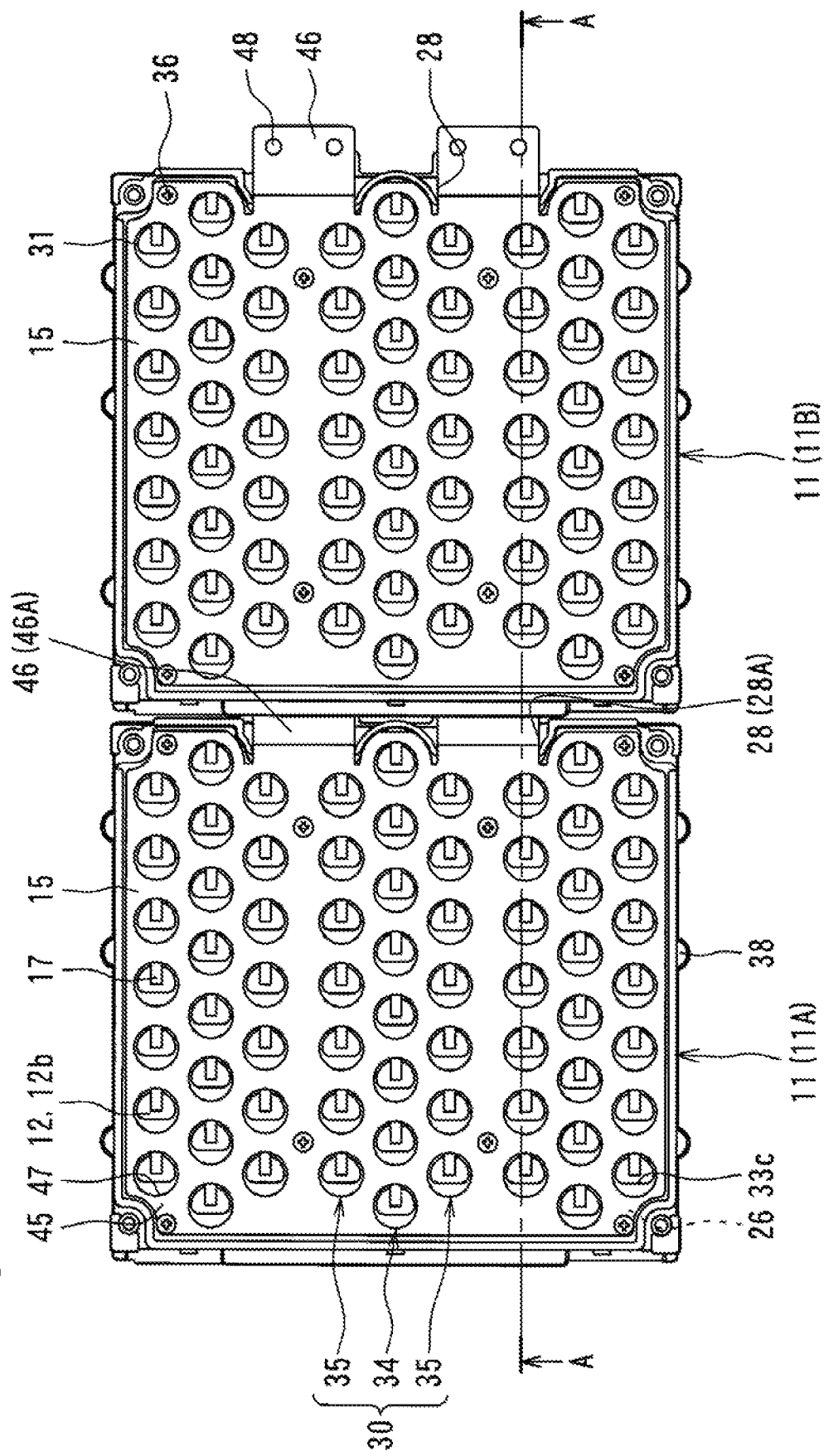
FIG. 4 is a bottom view of the battery block and the battery module according to the example of the exemplary embodiment.
Figure 5:
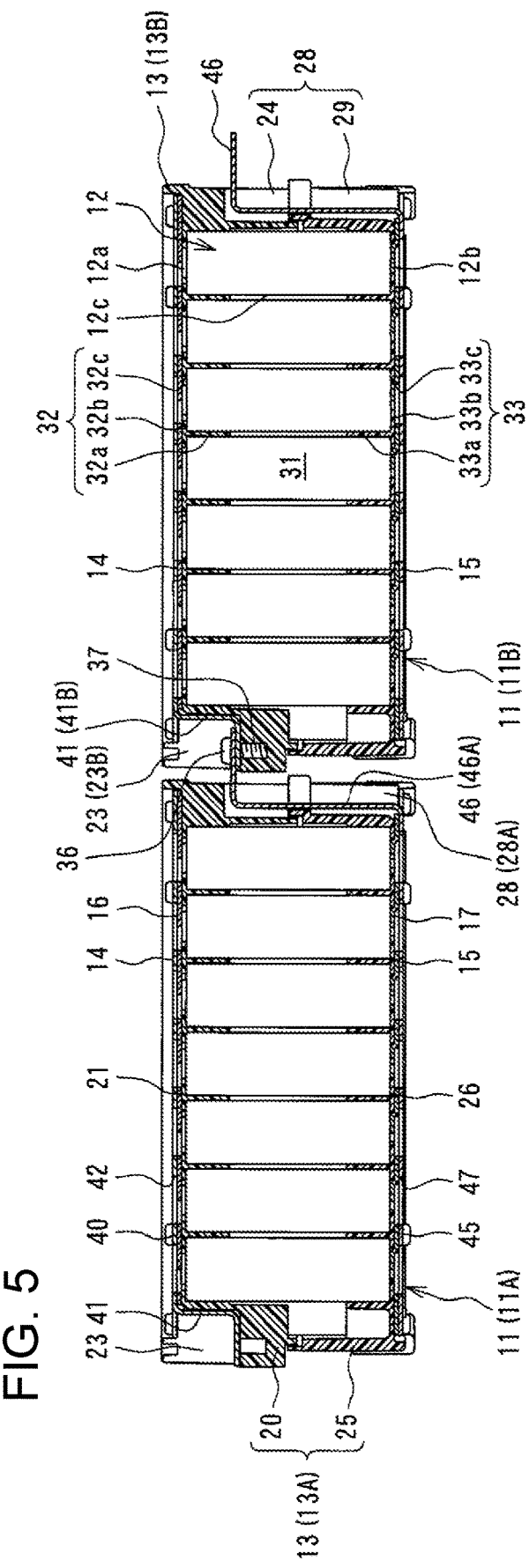
FIG. 5 is a cross-sectional view taken along line A-A of FIGS. 3 and 4.

A connection configuration of battery holder 13, positive-electrode current collector plate 14, negative-electrode current collector plate 15, and battery blocks 11A, 11B is described below in detail with reference to FIGS. 3 to 5. FIG. 3 is a plan view of battery module 10, FIG. 4 is a bottom view of battery module 10, and FIG. 5 is a cross-sectional view taken along line A-A of FIGS. 3 and 4.

As exemplified in FIGS. 1 to 5, battery holder 13 includes upper holder 20 and lower holder 25, and is configured by coupling these holders. Upper holder 20 and lower holder 25 are tray-shaped members in which a plurality of accommodating parts 32, 33 (see FIG. 5) for cylindrical batteries 12 are formed. Accommodating parts 32, 33 are cylindrical recesses into which an axial end portion of cylindrical battery 12 is inserted, and are formed in a staggered manner. When upper holder 20 is coupled to lower holder 25, accommodating parts 32, 33 overlap vertically, so that battery accommodating part 31 is formed. For example, a longitudinal length, a horizontal length, and a vertical length of upper holder 20 are substantially equal to those of lower holder 25.

Upper holder 20 is brought into close contact with a peripheral edge of positive-electrode-side end surface 12a and an upper end portion of side surface 12c in each cylindrical battery 12, thus holding an upper end portion of each cylindrical battery 12. Upper holder 20 includes upper wall 21 that has a substantially rectangular shape in a planar view and side wall 22 formed to be substantially vertical to upper wall 21. Accommodating parts 32 are formed inside of upper holder 20 surrounded by side wall 22 and the upper end portion of cylindrical battery 12 is inserted into accommodating part 32.

Opening 21a that exposes a part of positive-electrode-side end surface 12a is formed in upper wall 21. Positive-electrode lead plate 16 is connected via opening 21a to positive-electrode-side end surface 12a. When a valve of cylindrical battery 12 is broken and gas is discharged, the gas is discharged through opening 21a. Openings 21a have, for example, a substantially perfect circular shape and are formed in a staggered manner. Openings 21a are formed for all accommodating parts 32. A screw hole (not shown) into which screw 36 for fixing positive-electrode current collector plate 14 is inserted is formed in upper wall 21. For example, the screw hole is formed between accommodating part groups 30.

Lower holder 25 is brought into close contact with a peripheral edge of negative-electrode-side end surface 12b and a lower end portion of side surface 12c in each cylindrical battery 12, thus holding a lower end portion of each cylindrical battery 12. Lower holder 25 includes lower wall 26 that has a substantially rectangular shape in a planar view and side wall 27 formed to be substantially vertical to lower wall 26. Accommodating parts 33 are formed inside of lower holder 25 surrounded by lower wall 26 and the lower end portion of cylindrical battery 12 is inserted into accommodating part 33. Opening 26a that exposes a part of negative-electrode-side end surface 12b and a screw hole into which screw 36 is inserted are formed in lower wall 26, similarly to upper wall 21 of upper holder 20. Openings 26a have, for example, a substantially semicircular shape and are formed for all accommodating parts 33.

Coupling part 38 is formed on a side wall of each of upper holder 20 and lower holder 25. For example, upper holder 20 is placed on lower holder 25 in which the lower end portion of cylindrical battery 12 is inserted into accommodating part 33 and these holders are screwed at coupling parts 38, so that battery holder 13 in which cylindrical batteries 12 are accommodated is formed. Opening 21a of upper wall 21 is closed by positive-electrode-side end surface 12a of cylindrical battery 12 and opening 26a of lower wall 26 is closed by negative-electrode-side end surface 12b of cylindrical battery 12. Distal end portions of side walls 22, 27 abut to each other without any gaps. The inside of battery holder 13 in which cylindrical batteries 12 are accommodated is thus a closed space.

Positive-electrode current collector plate 14 is attached on upper holder 20. Positive-electrode current collector plate 14 has base 40 in which a plurality of openings 42 are formed and bus bar 41 extending from a longitudinal end portion (a front end portion) of base 40. Opening 42 is formed at a position overlapping opening 21a of upper holder 20. Base 40 is fixed on upper wall 21 of upper holder 20 by screws 36 so as to cover a substantially overall area of upper wall 21.

Bus bar 41 is formed by bending positive-electrode current collector plate 14. Bus bar 41 is bent downward at its base portion of a boundary between bus bar 41 and base 40, and then bent forward halfway. The base portion of bus bar 41 extends to be substantially vertical to base 40, whereas a distal end portion of bus bar 41 extends substantially parallel to base 40. A vertical length of bus bar 41 is shorter than that of upper holder 20. A longitudinal length of bus bar 41 is determined such that bus bar 41 does not extend forward from an end of battery holder 13 and is accommodated in recess 23.

Two bus bars 41 are formed in positive-electrode current collector plate 14. Two bus bars 41 have a same shape and size, and extend from a front end portion of base 40. Each bus bar 41 is formed between two battery accommodating parts 31 each of which constitutes accommodating part group 30, more specifically, between two battery accommodating parts 31 each of which forms column 34, that is to say, formed in a gap between two cylindrical batteries 12 in different columns 34. That is, a horizontal length of each bus bar 41 is shorter than a space between these two battery accommodating parts 31.

While only one bus bar 41 may be formed in the present exemplary embodiment, if a plurality of bus bars 41 are formed, an allowable amount of power of positive-electrode current collector plate 14 can be increased (this is also applicable to bus bar 46). For example, it is possible to increase efficiency of incorporation of cylindrical battery 12 in a case of forming a forked bus bar more than that in a case of forming one bus bar that is long in the horizontal direction. In addition, durability of the connection configuration is increased in the case of the forked bus bar.

Negative-electrode current collector plate 15 is attached on lower holder 25. Negative-electrode current collector plate 15 has base 45 in which a plurality of openings 47 are formed and bus bar 46 extending from a longitudinal other end portion (a rear end portion) of base 45. Bus bar 41 is disposed to be opposite to bus bar 46 in the longitudinal direction of battery holder 13. Battery blocks 11 can thus be serially connected to each other in the longitudinal direction. Opening 47 is formed at a position overlapping opening 26a of lower holder 25. Base 45 is fixed on lower wall 26 of lower holder 25 by screws 36 so as to cover a substantially overall area of lower wall 26.

Bus bar 46 is formed by bending negative-electrode current collector plate 15. Bus bar 46 is bent upward at its base portion of a boundary between bus bar 46 and base 45 and then bent rearward halfway. The base portion of bus bar 46 extends to be substantially vertical to base 45, whereas a distal end portion of bus bar 46 extends substantially parallel to base 45. A vertical length of bus bar 46 is longer than that of lower holder 25. As described later, a part of bus bar 46 is accommodated in upper-holder-side recess 24 formed in upper holder 20. The vertical length of bus bar 46 is longer than that of bus bar 41, and in view of transportation and management of members or the like, for example, is less than three times the vertical length of bus bar 41. The distal end portion of bus bar 46 projects rearward from the end of battery holder 13.

Two bus bars 46 are formed in negative-electrode current collector plate 15. Two bus bars 46 have a same shape and size, and extend from a rear end portion of base 45. Each bus bar 46 is formed between two battery accommodating parts 31 each of which constitutes accommodating part group 30, more specifically, between two battery accommodating parts 31 at ends of different columns 34, that is to say, formed in a gap between two cylindrical batteries 12 in different columns 34. A horizontal length of each bus bar 46 is shorter than the space between two battery accommodating parts 31, and for example, is equal to the horizontal length of bus bar 41.

As described above, in battery holder 13, recess 23 that accommodates bus bar 41 of positive-electrode current collector plate 14 and recess 28 that accommodates bus bar 46 of negative-electrode current collector plate 15 are respectively formed in a gap between two cylindrical batteries 12. Recess 23 is formed in a front end portion of battery holder 13 whereas recess 28 is formed in a rear end portion of battery holder 13. Recess 23 is formed between two battery accommodating parts 31 each of which constitutes accommodating part group 30 in the front end portion of battery holder 13. More specifically, recess 23 is formed in a gap between two battery accommodating parts 31 each of which constitutes center column 34 of accommodating part group 30. Similarly, recess 28 is formed in a gap between two battery accommodating parts 31 each of which constitutes center column 34 of accommodating part group 30 in the rear end portion of battery holder 13.

Three accommodating part groups 30 are formed in the horizontal direction of battery holder 13 in the present exemplary embodiment, and thus two recesses 23, 28 are formed while leaving an interval in the horizontal direction. A space in which no cylindrical battery 12 is arranged is formed between two accommodating part groups 30, and this space is wider than that in other portions. Recesses 23, 28 can be formed using this space without reducing the number of cylindrical batteries 12 incorporated.

Recess 23 is a hollow formed in the front end portion of upper holder 20, and is formed from an upper end of upper holder 20 to a vertically center portion of upper holder 20. A side wall of recess 23 is formed vertically, and a lower wall of recess 23 is formed to be substantially parallel to upper wall 21 of upper holder 20.

Recess 23 accommodates entire bus bar 41. Longitudinal, horizontal, and vertical sizes of recess 23 are equal to or larger than those of bus bar 41. Bus bar 41 is disposed along the side wall and the lower wall of recess 23 and is entirely accommodated in recess 23. Screw hole 37 is formed in the lower wall of recess 23. Screw 36 for fixing bus bars 41, 46 is placed in screw hole 37. The distal end portion of bus bar 41 in which through-hole 43 into which screw 36 is inserted, is disposed along the lower wall of recess 23 in a manner that through-hole 43 vertically overlaps screw hole 37.

Recess 28 is a hollow formed in the rear end portions of upper holder 20 and lower holder 25, and is formed from a lower end of lower holder 25 to the vertically center portion of upper holder 20. Recess 28 is constituted by upper-holder-side recess 24 formed in upper holder 20 and lower-holder-side recess 29 formed along a vertical entire length of lower holder 25. Upper-holder-side recess 24 and lower-holder-side recess 29 are vertically arranged and are continuous with each other.

Recess 28 accommodates a part of bus bar 46. Recess 28 accommodates a vertically extending portion of bus bar 46 entirely and a part of a rearwardly extending portion of bus bar 46. Horizontal and vertical sizes of recess 28 are equal to or larger than those of bus bar 46. A longitudinal length of recess 28 is shorter than that of bus bar 46. The distal end portion of bus bar 46 in which through-hole 48 into which screw 36 is inserted is formed extends from recess 28 to project rearward from the end of battery holder 13.

Recess 23 and recess 28 are formed to vertically overlap with each other. That is, vertical lengths of recesses 23, 28 overlap with each other in the longitudinal direction. When the vertical length of recess 23 is set, recess 28 is formed such that an upper end of recess 28 is positioned above a lower end of recess 23. In battery module 10, an upper portion of recess 28A of battery block 11A and a lower portion of recess 23B of battery block 11B overlap with each other and are opposite to each other in the longitudinal direction. Consequently, a distal end portion of bus bar 46A extending from recess 28A of battery block 11A to project rearward can be inserted into recess 23B of battery block 11B.

In battery module 10, bus bar 41B of battery block 11B is connected to bus bar 46A of battery block 11A, as described above. Bus bar 46A of battery block 11A is placed on bus bar 41B such that through-hole 48 vertically overlaps through-hole 43. Screws 36 are then inserted into through-holes 43, 48 and placed in screw holes 37, so that bus bar 41B is electrically connected to bus bar 46A and a connection configuration of battery blocks 11A, 11B is achieved.

That is, bus bar 46A of battery block 11A extends toward battery block 11B to be connected to bus bar 46B of battery block 11B in recess 23B of battery block 11B. A side wall of battery holder 13A that forms a rear surface of battery block 11A and a side wall of battery holder 13B that forms a front surface of battery block 11B may contact with each other, but in the present exemplary embodiment, are slightly spaced apart from each other in view of tolerances on components. It is permissible that bus bar 41B is not screwed but welded to bus bar 46A.

A space between battery blocks is small in battery module 10 configured by connecting battery blocks 11A, 11B as described above, and thus battery module 10 has high capacity density. Cylindrical batteries 12 are efficiently accommodated in battery holder 13 in a staggered manner, and recesses 23, 28 are formed using a space in which no cylindrical battery 12 is arranged, and thus the number of cylindrical batteries 12 incorporated is not reduced. Bus bars 41, 46 are accommodated in recesses 23, 28, respectively. Bus bars 41, 46 do not extend largely from the end of battery holder 13 and it is possible to prevent the space between two battery blocks 11 from being increased due to bus bars 41, 46. In addition, recesses 23, 28 are formed and thus bus bars 41, 46 are bent gently, which reduces concentration of stress and the durability of the connection configuration is increased.

A design of the exemplary embodiment described above may be appropriately changed without impairing the object of the present disclosure. For example, the vertical length of a positive-electrode-side bus bar may be longer than that of a negative-electrode-side bus bar. In addition, it may be configured that a positive-electrode-side bus bar of a first battery block may extend toward a second battery block to be connected to a negative-electrode-side bus bar of the second battery block in a second recess in the second battery block. Moreover, a battery module may be configured using a current collector plate exemplified in FIG. 6, and metallic holder 50 exemplified in FIG. 7 may be used.

Figure 6:
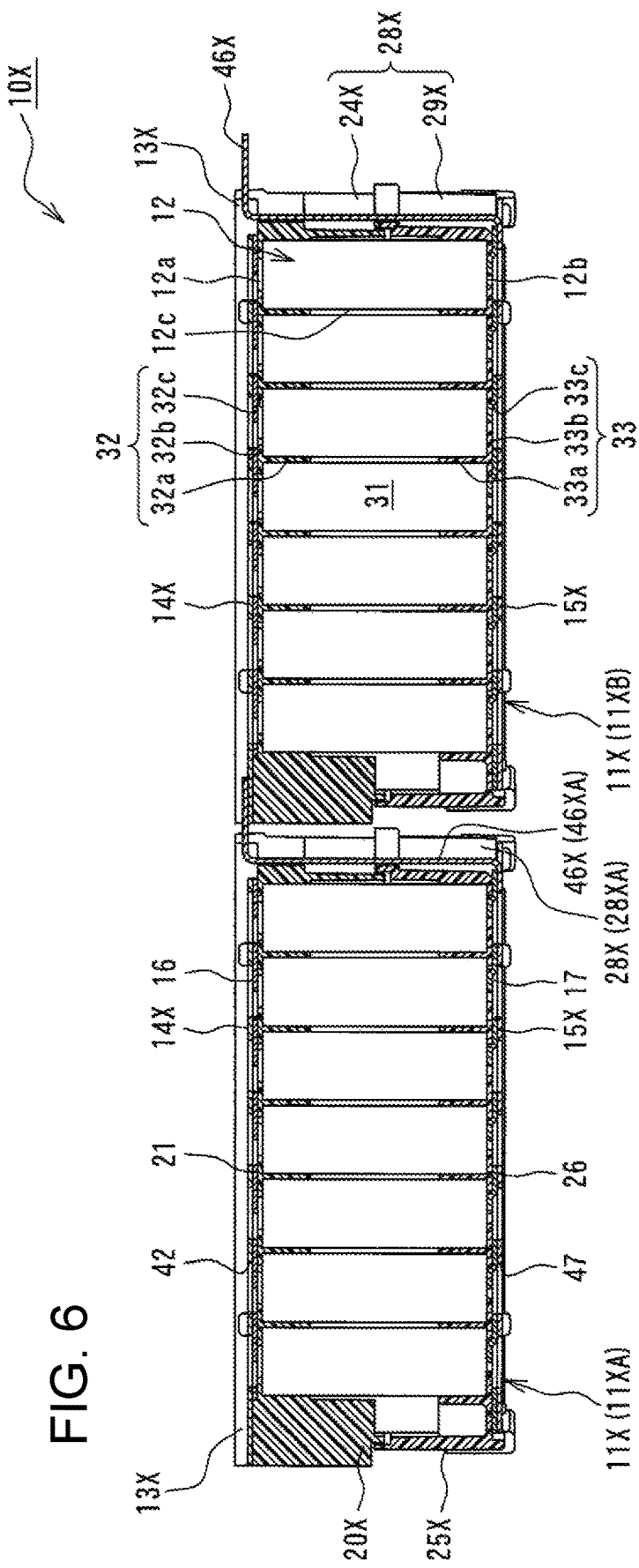
FIG. 6 is a cross-sectional view of a battery module according to another example of the exemplary embodiment.

FIG. 6 is a cross-sectional view of battery module 10X according to another example of the exemplary embodiment. In FIG. 6, same reference numerals are used to designate same configuration elements as those of battery module 10. Battery module 10X exemplified in FIG. 6 is different from battery module 10 in that a bus bar is not formed in positive-electrode current collector plate 14X and bus bar 46X is formed only in negative-electrode current collector plate 15X. For example, two bus bars 46X are arranged in the horizontal direction as in negative-electrode current collector plate 15. However, a vertical length of bus bar 46X is longer that an axial length of cylindrical battery 12. In battery module 10X, bus bar 46XA of battery block 11XA extends toward battery block 11XB to be placed on positive-electrode current collector plate 14XB and connected to positive-electrode current collector plate 14XB. It is permissible that positive-electrode current collector plate 14XB may be screwed to bus bar 46XA or may be welded to bus bar 46XA.

As described above, battery module 10X does not have a positive-electrode-side bus bar, and thus a first recess is not formed in upper holder 20X of battery holder 13X. Recess 28X (second recess) that accommodates bus bar 46X is formed as a recess in lower holder 25X. Recess 28X is constituted by upper-holder-side recess 24X and lower-holder-side recess 29, and is formed, for example, along a vertical entire length of battery holder 13X. A vertically extending portion of bus bar 46XA is accommodated in recess 28XA, and thus a space between battery blocks 11XA, 11XB can be reduced and the capacity density of a module can be enhanced.

Figure 7:
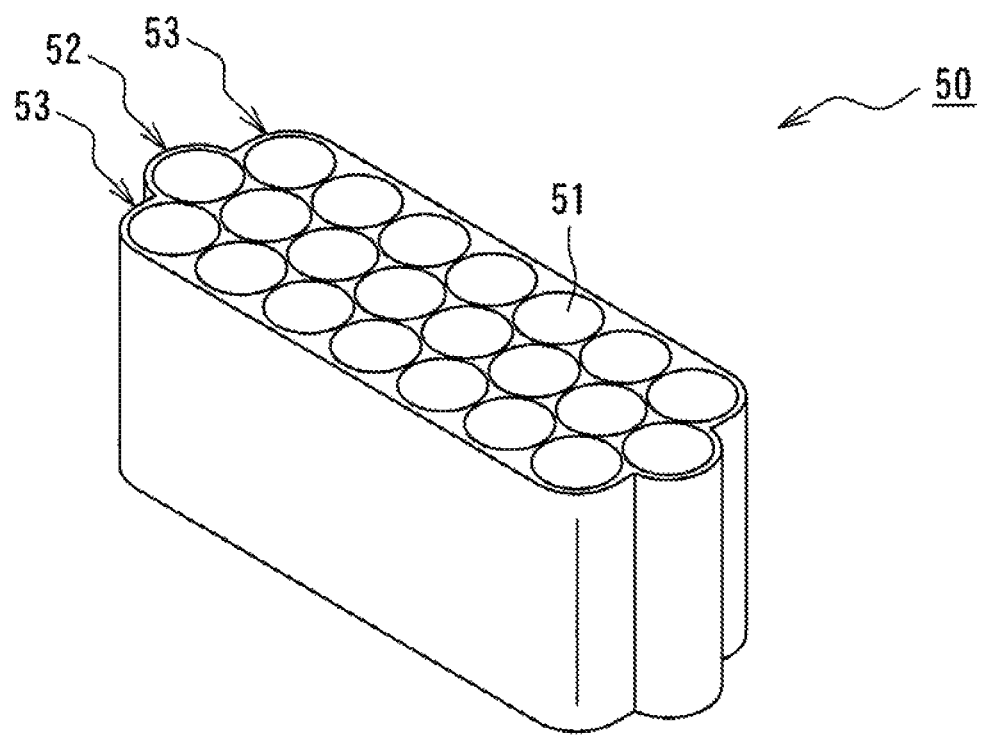
FIG. 7 shows a metallic holder according to the example of the exemplary embodiment.

FIG. 7 is a perspective view of metallic holder 50 that is an example of the exemplary embodiment. As exemplified in FIG. 7, metallic holder 50 is a block-shaped member that includes a plurality of battery accommodating parts 51 formed in three columns in which cylindrical batteries (not shown) of adjacent columns are arranged in a staggered manner. Metallic holder 50 is made of a material with high thermal conductivity for the purpose of achieving uniform temperature of cylindrical batteries 12, for example, during a normal operation. In view of weight-reduction, workability, and the like, a metal material mainly containing aluminum is commonly used.

Metallic holder 50 is configured such that the number of battery accommodating parts 51 forming center column 52 of three columns of battery accommodating parts 51 is larger than the number of battery accommodating parts 51 forming columns 53 at both ends by one. Each of columns 52, 53 is formed by arranging battery accommodating parts 51 straight in the longitudinal direction. Battery accommodating parts 51 forming column 52 and battery accommodating parts 51 forming column 53 are arranged in a staggered manner to be shifted from each other by a half pitch in the longitudinal direction.

In a battery block using metallic holder 50, metallic holder 50 is accommodated in a resin battery holder. While a battery holder that has a similar appearance to battery holder 13 can be used, an accommodating part into which metallic holder 50 can be inserted is formed inside of the holder instead of accommodating parts 32, 33. The battery holder accommodates, for example, two or more metallic holders 50. In this case, a recess accommodating a bus bar is formed between two battery accommodating parts 51 each of which constitutes metallic holder 50 in a longitudinal end portion of the battery holder.

The invention claimed is:

1. A battery block comprising:
   a plurality of cylindrical batteries;
   a battery holder that accommodates the cylindrical batteries arranged in a staggered manner;
   a positive-electrode current collector plate that is electrically connected to a positive electrode terminal of each of the cylindrical batteries; and
   a negative-electrode current collector plate that is disposed to be opposite to the positive-electrode current collector plate with each of the cylindrical batteries being provided between the negative-electrode current collector plate and the positive-electrode current collector plate and that is electrically connected to a negative electrode terminal of each of the cylindrical batteries, wherein
      at least one of the positive-electrode current collector plate and the negative-electrode current collector plate includes a base, a bus bar that extends in an axial direction of each of the cylindrical batteries from the base to be electrically connected to a current collector plate of another battery block and a distal end portion of the bus bar that extends parallel to the base,
      the battery holder includes a plurality of columns of the cylindrical batteries where the cylindrical batteries in adjacent columns are arranged in the staggered manner and the cylindrical batteries near an end portion of the battery holder respectively have different distances to the end portion of the battery holder by the staggered arrangement of the cylindrical batteries, and
      a recess that accommodates the bus bar is formed in a gap between two the cylindrical batteries in two columns close to the end portion of the battery holder.

2. The battery block according to claim 1, wherein
   the battery holder includes two or more groups of battery accommodating parts, and in each of the groups the battery accommodating parts are formed in three columns and the cylindrical batteries in adjacent columns are arranged in the staggered manner,
   each of the groups is configured in a manner that a number of the battery accommodating parts forming a center column of the three columns is larger than a number of the battery accommodating parts forming a column at each of both ends by one, and
   the recess is formed between two groups of the battery accommodating parts each of which constitutes the group, in the end portion of the battery holder.

3. The battery block according to claim 1,
   further comprising two or more metallic holders that each accommodate a plurality of battery accommodating parts formed in three columns in which the cylindrical batteries in adjacent columns are arranged in a staggered manner, wherein
      the battery holder accommodates the two or more metallic holders, and
      the recess is formed between two of the battery accommodating parts which respectively constitute each of the metallic holders in the end portion of the battery holder.

4. The battery block according to claim 1, wherein two or more of the bus bars are formed in at least one of the positive-electrode current collector plate and the negative-electrode current collector plate.

5. The battery block according to claim 1, wherein
   the bus bars are formed in the positive-electrode current collector plate and the negative-electrode current collector plate, and
   the recess includes a first recess that is formed in one end portion of the battery holder and accommodates a positive-electrode-side one of the bus bars that is the one of the bus bars of the positive-electrode current collector plate, and a second recess that is formed in another end portion of the battery holder and accommodates a negative-electrode-side one of the bus bars that is the one of the bus bars of the negative-electrode current collector plate.

6. A battery module comprising the battery blocks according to claim 5 connected in series, wherein
   the battery block includes a first battery block and a second battery block, and
   a positive-electrode-side bus bar of the first battery block extends toward the second battery block to be connected to a negative-electrode-side bus bar of the second battery block in a second recess in the second battery block,
   or
   a negative-electrode-side bus bar of the first battery block extends toward the second battery block to be connected to a positive-electrode-side bus bar of the second battery block in a first recess in the second battery block.

7. A battery block comprising:
   a plurality of cylindrical batteries;
   a battery holder that accommodates the cylindrical batteries arranged in a staggered manner;
   a positive-electrode current collector plate that is electrically connected to a positive electrode terminal of each of the cylindrical batteries; and
   a negative-electrode current collector plate that is disposed to be opposite to the positive-electrode current collector plate with each of the cylindrical batteries being provided between the negative-electrode current collector plate and the positive-electrode current collector plate and that is electrically connected to a negative electrode terminal of each of the cylindrical batteries, wherein
      at least one of the positive-electrode current collector plate and the negative-electrode current collector plate includes a base and a bus bar that extends in an axial direction of each of the cylindrical batteries from base and is bent from the base to be electrically connected to a current collector plate of another battery block,
      the battery holder includes a plurality of columns of the cylindrical batteries where the cylindrical batteries in adjacent columns are arranged in the staggered manner and the cylindrical batteries near an end portion of the battery holder respectively have different distances to the end portion of the battery holder by the staggered arrangement of the cylindrical batteries, and
      a recess that accommodates the bus bar is formed in a gap between two the cylindrical batteries in two columns close to the end portion of the battery holder.

8. A battery block comprising:
   a plurality of cylindrical batteries;
   a battery holder that accommodates the cylindrical batteries arranged in a staggered manner;

a positive-electrode current collector plate that is electrically connected to a positive electrode terminal of each of the cylindrical batteries; and a negative-electrode current collector plate that is disposed opposite to the positive-electrode current collector plate with each of the cylindrical batteries being provided between the negative-electrode current collector plate and the positive-electrode current collector plate and that is electrically connected to a negative electrode terminal of each of the cylindrical batteries, wherein the positive-electrode current collector plate includes a first bus bar and the negative-electrode current collector plate includes a second bus bar, the first bus bar and the second bus bar each extends in an axial direction of the cylindrical batteries and are electrically connected to a current collector plate of another battery block, the battery holder includes a plurality of columns of the cylindrical batteries where the cylindrical batteries in adjacent columns are arranged in the staggered manner and the cylindrical batteries near an end portion of the battery holder respectively have different distances to the end portion of the battery holder by the staggered arrangement of the cylindrical batteries, and two recesses, each accommodating one of the first bus bar and the second bus bar are formed in corresponding gaps between two cylindrical batteries in two columns close to opposite end portions of the battery holder.

* * * * *